(12) United States Patent
Carpick et al.

(10) Patent No.: US 10,908,069 B2
(45) Date of Patent: Feb. 2, 2021

(54) IN SITU TRIBOMETER AND METHODS OF USE

(71) Applicant: THE TRUSTEES OF THE UNIVERSITY OF PENNSYLVANIA, Philadelphia, PA (US)

(72) Inventors: Robert W. Carpick, Philadelphia, PA (US); Nitya Nand Gosvami, Philadelphia, PA (US)

(73) Assignee: The Trustees of the University of Pennsylvania, Philadelphia, PA (US)

(*) Notice: Subject to any disclaimer, the term of this patent is extended or adjusted under 35 U.S.C. 154(b) by 0 days.

(21) Appl. No.: 15/597,318

(22) Filed: May 17, 2017

(65) Prior Publication Data

US 2017/0254740 A1 Sep. 7, 2017

Related U.S. Application Data

(63) Continuation of application No. PCT/US2015/062436, filed on Nov. 24, 2015.

(Continued)

(51) Int. Cl.
| | |
|---|---|
| *G01N 19/02* | (2006.01) |
| *G01Q 60/26* | (2010.01) |
| *G01Q 70/10* | (2010.01) |
| *G01Q 30/14* | (2010.01) |
| *G01Q 10/04* | (2010.01) |
| *G01Q 60/24* | (2010.01) |
| *G01Q 80/00* | (2010.01) |

(52) U.S. Cl.
CPC ............ *G01N 19/02* (2013.01); *G01Q 60/26* (2013.01); *G01Q 70/10* (2013.01); *G01N 2203/0246* (2013.01); *G01Q 10/04* (2013.01); *G01Q 30/14* (2013.01); *G01Q 60/24* (2013.01); *G01Q 80/00* (2013.01)

(58) Field of Classification Search
CPC ... G01N 19/02; G01Q 60/26; G01Q 60/38–46
See application file for complete search history.

(56) References Cited

U.S. PATENT DOCUMENTS 4,935,634 A   6/1990 Hansma et al.
5,400,647 A * 3/1995 Elings ............... G01Q 10/06
                                                73/105

(Continued)

OTHER PUBLICATIONS

Scratching the Surface: Fundamental Investigations of Tribology with Atomic Force Microscopy, Robert W. Carpick and Miguel Salmeron*,Chemical Reviews 1997 97 (4), 1163-1194, DOI: 10.1021/cr960068q.*

(Continued)

*Primary Examiner* — Alexander A Mercado
(74) *Attorney, Agent, or Firm* — Baker Botts, L.L.P.

(57) ABSTRACT

Techniques for determining a characteristic of a sample using an atomic force microscope including a cantilever having a probe attached thereto, including positioning the sample within a cell and sliding the probe over a sliding zone of the sample within the cell. Lateral and vertical deformations of the cantilever are detected using the atomic force microscope as the probe is slid over the sliding zone. One or more characteristics are determined based on the detected lateral deformations of the cantilever.

12 Claims, 8 Drawing Sheets

Schematic of the In Situ Tribometer

Related U.S. Application Data

(60) Provisional application No. 62/084,377, filed on Nov. 25, 2014.

(56) References Cited

U.S. PATENT DOCUMENTS

| | | | |
|---|---|---|---|
| 5,654,546 A | 8/1997 | Lindsay | |
| 5,804,708 A * | 9/1998 | Yamanaka | B82Y 35/00 73/105 |
| 6,229,609 B1 * | 5/2001 | Muramatsu | B82Y 20/00 250/234 |
| 6,880,386 B1 * | 4/2005 | Krotil | B82Y 35/00 73/105 |
| 8,884,608 B2 | 11/2014 | Neu et al. | |
| 2005/0009197 A1 * | 1/2005 | Adams | G01Q 60/34 436/164 |
| 2005/0081599 A1 * | 4/2005 | Wortmann | G01N 3/56 73/7 |
| 2005/0199065 A1 | 9/2005 | Dunegan | |
| 2007/0285078 A1 * | 12/2007 | Kusaka | B82Y 35/00 324/72 |
| 2009/0007645 A1 * | 1/2009 | Shih | B82Y 35/00 73/105 |
| 2009/0027690 A1 * | 1/2009 | Fukuzawa | B82Y 35/00 356/600 |
| 2009/0151434 A1 * | 6/2009 | Kim | G01Q 30/10 73/105 |
| 2011/0265559 A1 | 11/2011 | Oh et al. | |

OTHER PUBLICATIONS

Calibration of frictional forces in atomic force microscopy, D. F. Ogletree, R. W. Carpick, and M. Salmeron, Review of Scientific Instruments, 1996, 67:9, 3298-3306.*

Coles, Jeffrey M., et al. "In situ friction measurement on murine cartilage by atomic force microscopy." Journal of biomechanics 41.3 (2008): 541-548.*

Balasubramaniam Vengudusamy, Jonathan H. Green, Gordon D. Lamb, Hugh A. Spikes, Tribological properties of tribofilnns formed from ZDDP in DLC/DLC and DLC/steel contacts, Tribology International, vol. 44, Issue 2, 2011, pp. 165-174.*

International Search Report dated Mar. 2, 2016 in International Application No. PCT/US2015/062436.

Pacific Nanotechnology. Design, Components and Operation of Atomic Force Microscope. Feb. 2006 http://www.azonano.com/article.aspx? ArticleID=1511 pp. 5-8, Feedback Control, AFM theory & Instrumentation (Accessed on May 3, 2018).

* cited by examiner

Imaging of the Sliding Zone with Steel Probe

- Imaging was performed with the same steel probe which was used for producing the tribofilm (central region with bright contrast).

IN SITU TRIBOMETER AND METHODS OF USE

CROSS-REFERENCE TO RELATED APPLICATIONS

This application is a continuation of International Application No. PCT/US2015/062436, filed Nov. 24, 2015, which claims priority to U.S. Provisional Application No. 62/084,377, filed Nov. 25, 2014, each of which is incorporated by reference herein in its entirety.

BACKGROUND

The disclosed subject matter provides systems and methods for determining characteristics of surfaces.

Tribology is the study of friction and the interaction between surfaces. Tribology can be relevant to the design of machine components that move and contact each other, causing wear and friction problems that should be understood for reducing material losses and improving energy efficiency. For example, tribology plays an important role in designing automotive engine components, turbines, gears, bearings, manufacturing equipment, and various other industrial products.

In tribology, instruments called tribometers can be used to measure the coefficient of friction between two surfaces, and can also measure the wear of the sliding surfaces at the macro scale. Certain methods can characterize the sliding interface ex situ after the test. Such ex situ characterization can require removal and cleaning of the specimen from the tribometer, which can lead to irreversible chemical changes within the region of interest.

Macroscopic tribological behavior of materials is governed by the phenomena occurring at the asperity level contacts, and it is necessary to know the structure of the materials at such a level of resolution to fully understand their tribological behavior. Tribological studies can be performed at the nano scale using atomic force microscopy (AFM) which uses a sharp nanometer-scale (single-asperity) probe. Certain AFM probes are made of silicon, or silicon with ceramic or metallic coatings, which may not be robust enough to sustain prolonged sliding test conditions. Moreover, AFM probe geometry does not necessarily represent real engineering contacts where multi-asperity contact occurs at the interface.

SUMMARY

In one aspect of the disclosed subject matter, a tribometer including an atomic force microscope and a cantilever, configured to detect lateral and vertical positions thereof, are provided. The tribometer can include a probe attached to an end of the cantilever of the atomic force microscope. The tribometer can include a cell for holding a sample. The tribometer can include a control unit communicatively coupled with the atomic force microscope, configured to slide the probe over the sliding zone of the sample within the cell. The control unit can determine a characteristic of the sliding zone based on a lateral deflection signal of the cantilever generated from the detected deformations of the cantilever.

In accordance with certain embodiments, the characteristic of the sliding zone can include one or more of a coefficient of friction, a characteristic corresponding to wear, a characteristic corresponding to adhesion, or a characteristic corresponding to elastic modulus. Additionally, the control unit can be further configured to simultaneously image the topography of the sliding zone of the sample while determining the characteristic based on a vertical deflection signal of the cantilever generated from the detected positions of the cantilever.

In accordance with certain embodiments, the cell can be a liquid cell and the sliding zone of the sample can be immersed in a lubricant. Additionally, the tribometer can include a heating element adapted to maintain the cell at a predetermined temperature. In certain embodiments, the probe can be a spherical probe. The probe can have a diameter of between 1 µm and 100 µm. In certain embodiments, the probe can be formed from steel.

The disclosed subject matter also provides methods for determining a characteristic of a sample using an atomic force microscope including a cantilever having a probe attached thereto. An example method can include positioning the sample within a cell and sliding the probe over a sliding zone of the sample within the cell. The method can include detecting lateral and vertical positions of the cantilever using the atomic force microscope as the probe is slid over the sliding zone. A characteristic of the sliding zone can be determined based on a lateral deflection signal of the cantilever generated from the detected positions of the cantilever.

BRIEF DESCRIPTION OF THE DRAWINGS

Further features, the nature, and various advantages of the disclosed subject matter will be more apparent from the following detailed description and the accompanying drawings in which.

Figure 1A:
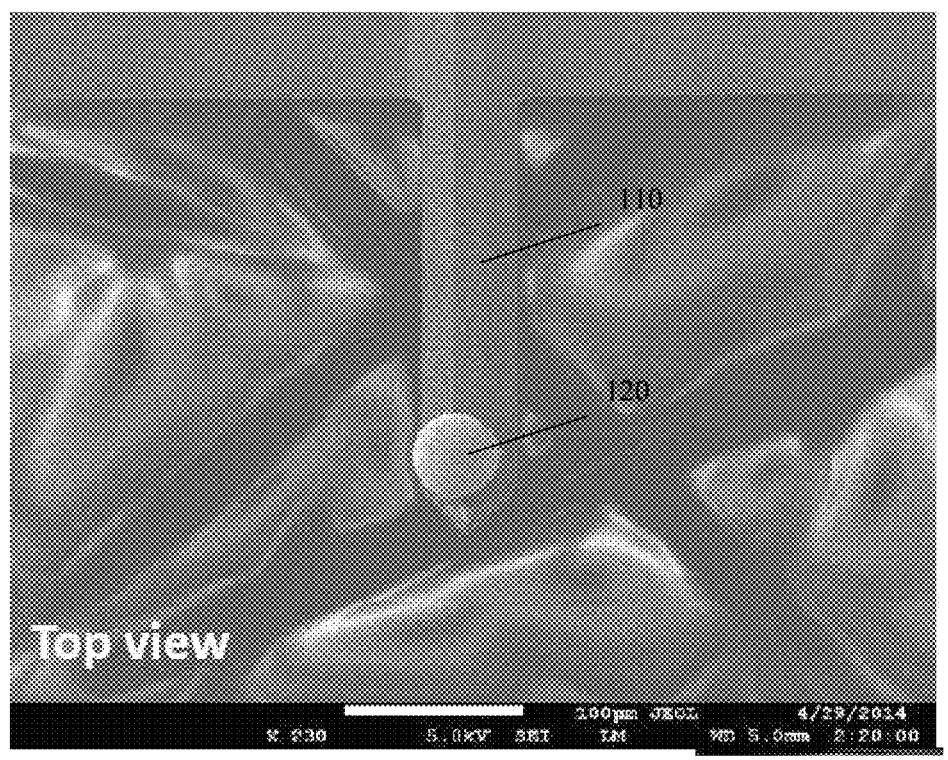
FIG. 1A shows a top view of an exemplary device including a cantilever and a spherical steel probe in accordance with the disclosed subject matter.

Throughout the drawings, the same reference numerals and characters, unless otherwise stated, are used to denote like features, elements, components or portions of the illustrated embodiments. Moreover, while the disclosed subject matter will now be described in detail with reference to the figures, it is done so in connection with the illustrative embodiments.

DETAILED DESCRIPTION

The disclosed subject matter is generally directed to systems and methods for simultaneously measuring friction at the sliding interface between a probe and a substrate surface, and measuring the morphology and nanoscale tribomechanical properties of the substrate and any resulting tribofilm deposited on the substrate or worn or modified region of the substrate.

Figure 1B:
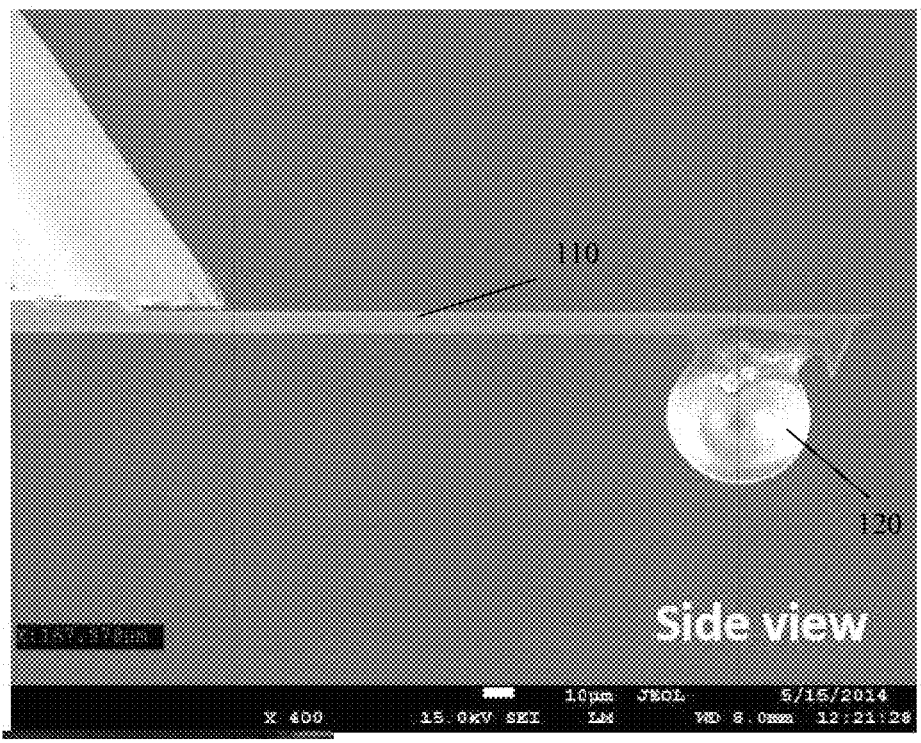
FIG. 1B shows a side view of the exemplary device of FIG. 1A.
Figure 1C:
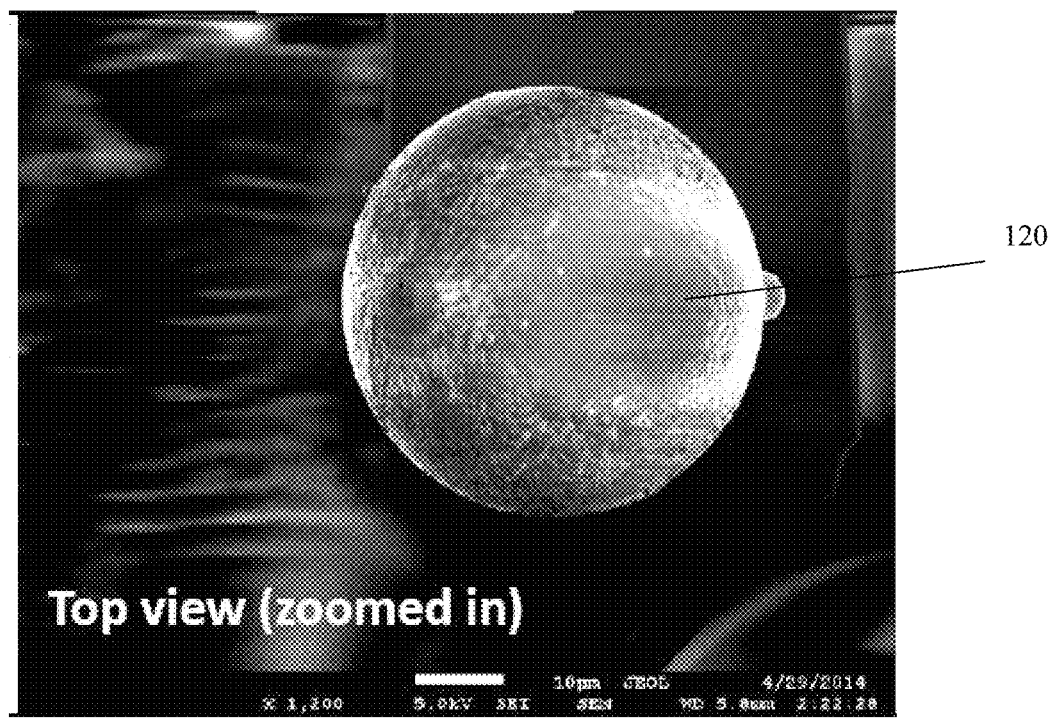
FIG. 1C shows the same view of the spherical probe as shown in FIG. 1A at a higher magnification.

In accordance with one aspect of the disclosed subject matter, a tribometer can include a cantilever 110 and a spherical probe 120 coupled to the cantilever 110. Various views of an exemplary steel probe 120 mounted to a cantilever 110 in accordance with the disclosed subject matter are shown in FIGS. 1A-1C. The images in FIGS. 1A-1C were taken using a scanning electron microscope. FIG. 1A shows a top view of the exemplary device including a cantilever 110 and a spherical steel probe 120. FIG. 1B shows a side view of the same device. The spherical probe 120 of FIG. 1B is glued to the cantilever 110. However, other methods of coupling the spherical probe to the cantilever can be used. FIG. 1C shows the same view of the spherical probe as shown in FIG. 1A at a higher magnification.

Figure 2:
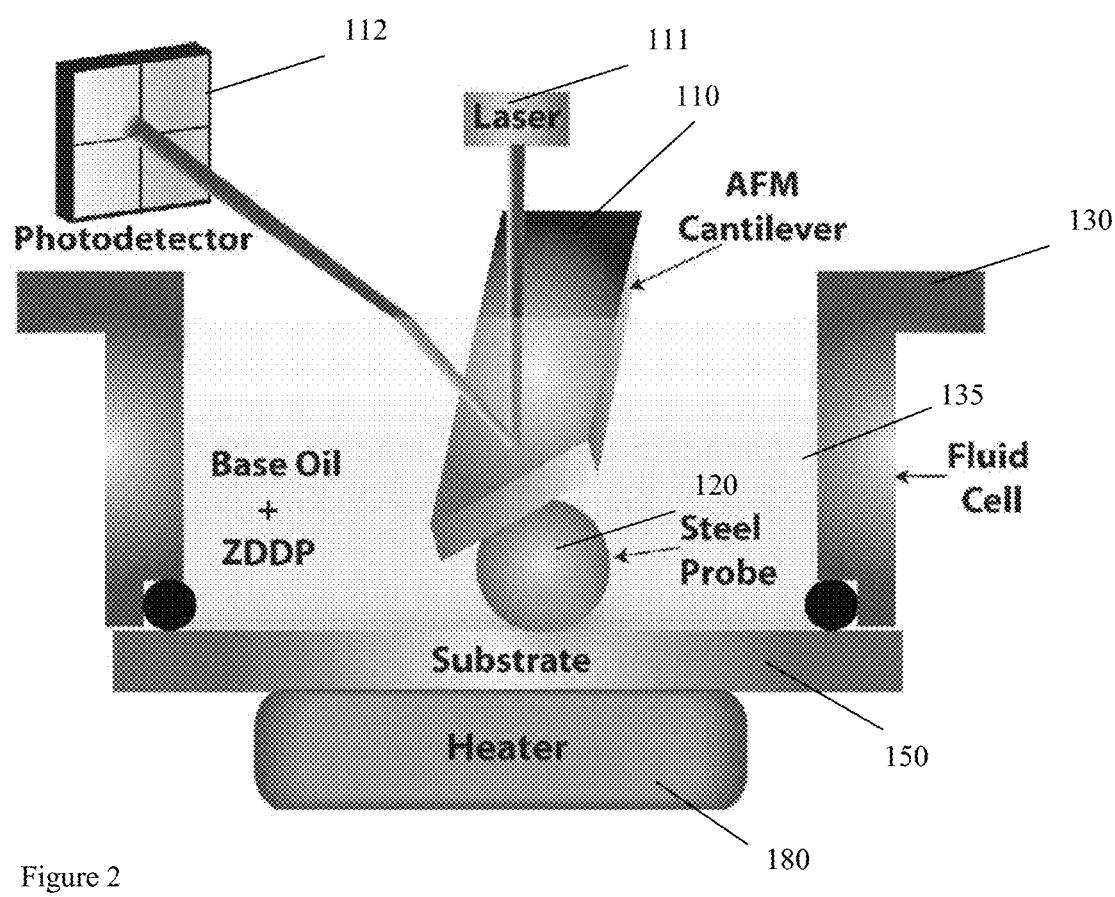
FIG. 2 is a schematic of an in situ tribometer in accordance with an exemplary embodiment of the disclosed subject matter.

In accordance with another aspect, the disclosed subject matter can include a method for using a tribometer including a spherical probe for simultaneous coefficient of friction measurements and in situ imaging. FIG. 2 is a schematic of an in situ tribometer in accordance with an exemplary embodiment of the disclosed subject matter. The tribometer can include a spherical probe 120 that can be made of steel. The tribometer can also include a cantilever 110 such as a AFM cantilever. The cantilever probe 120 used in the tribometer can be, for example, a probe as shown in FIGS. 1A through 1C.

The tribometer can be used to measure certain characteristics of contact between the probe 120 and a surface of a substrate 150. The substrate 150 can be, for example, a steel substrate. The substrate can be part of a fluid cell 130. The fluid cell 130 can also include, for example, a heater 180 for simulating relevant operating temperatures. In accordance with one embodiment of the disclosed subject matter, the heater 180 can simulate operating temperatures between about room temperature and about 250° C. The disclosed methods can also be used at pressures up to 1 GPa.

The fluid cell 130 can further include a lubricant 135. The lubricant 135 can include, for example, engine oil. The lubricant can also include additives such as, for example, Zinc Dialkyldithiophosphate (ZDDP) or nanoparticles.

As further shown in FIG. 2, an atomic force microscope can be used to measure characteristics of the interaction between the probe 120 and the substrate 150. The atomic force microscope can include a laser 111 and a photodetector 112, as conventionally understood by those of skill in the art, for detecting the lateral and vertical positions of the cantilever 110.

Figure 3:
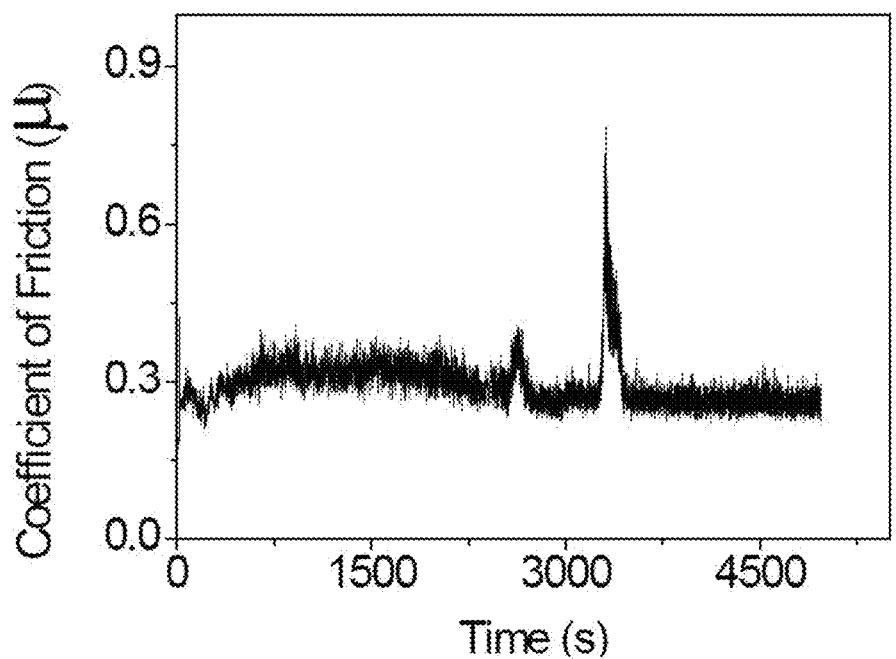
FIG. 3 shows friction measurements using an exemplary embodiment of a spherical probe.

FIG. 3 shows friction measurements using an exemplary embodiment of a spherical probe. The substrate 150 was polished steel, and the lubricant 135 was a polyalphaolefin base oil containing one percent ZDDP by weight. The heater was used to increase the temperature to 100° C.

Figure 4:
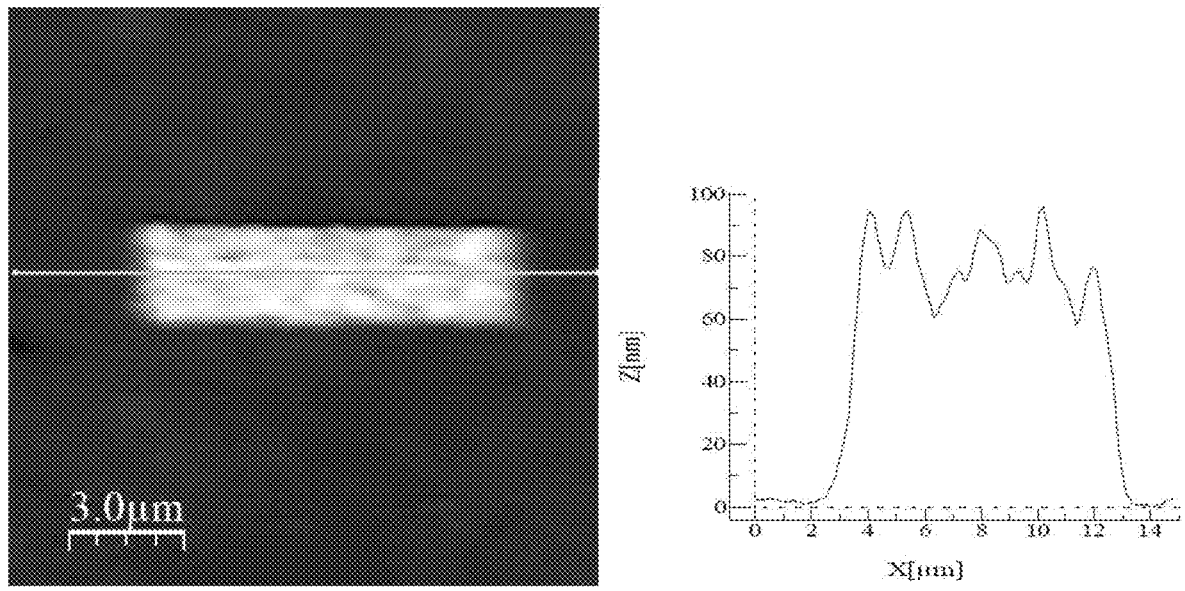
FIG. 4 shows measurements using a device in accordance with an exemplary embodiment of the disclosed subject matter.
Figure 5:
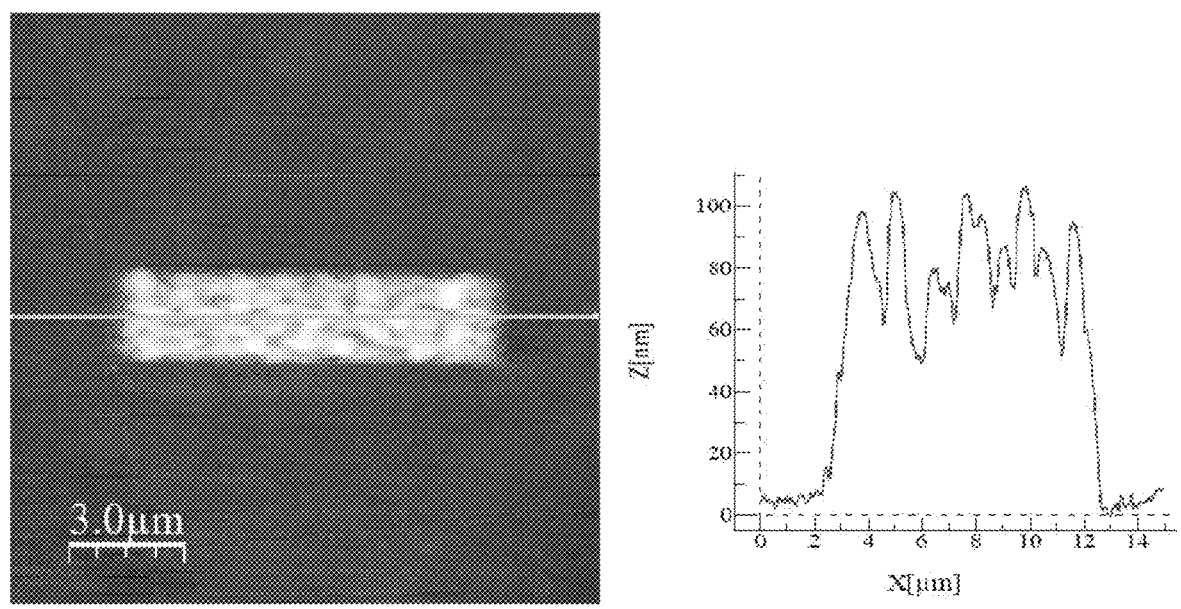
FIG. 5 shows measurements using a silicon cantilever having a sharp AFM probe.

FIGS. 4 and 5 show a comparison between measurements using a device in accordance with an exemplary embodiment of the disclosed subject matter and a silicon cantilever having a nanometer-scale sharp AFM probe. Imaging with these two different devices showed similar heights and topographical features of the tribochemical film generated using the steel probe 120. Advantageously, the tribometer including a spherical probe can image the surface without removing the substrate from the fluid cell. Removing the substrate and exposing it to the external environment can change the physical and chemical properties of the tribological area of interest.

As embodied herein, the spherical probe can be coupled to the cantilever using any coupling technique known in the art including, for example, with epoxy glue. The term "spherical," as used herein, is not limited to a mathematical sphere and is intended to cover any probe that is generally spherical in shape. For example, the spherical probe can be spheroid such as an oblate spheroid. In accordance with other embodiments of the disclosed subject matter, the spherical probe can be a cylinder or a hemisphere.

In accordance with an exemplary embodiment, the disclosed subject matter also provides in situ methods for gathering data about contact between a spherical probe and a substrate surface. An example method can include providing a spherical probe. The spherical probe can be coupled to a cantilever. The spherical probe can be, for example, a steel spherical probe. The method can further include providing a substrate having a first surface. The substrate can be, for example, a steel substrate. However, a person skilled in the art will recognize that the disclosed subject matter is not limited to use for steel-on-steel contact and can be used for characterizing the interaction between any material pair. For example, one or both of the probe and the first surface can be silicon, coatings such as diamond or metallic coatings, alloys, ceramics, or polymers.

The method can further include contacting the first surface of the substrate with the spherical probe. For example, the method can include sliding the spherical probe across a sliding zone of the first surface of the substrate. In accordance with embodiments of the disclosed subject matter, contacting the first surface of the substrate with the spherical probe can include contacting the first surface of the substrate with the spherical probe in the presence of a lubricant such as, for example, engine oil. The lubricant can include one or more additives such as, for example, Zinc Dialkyldithiophosphates (ZDDPs), or nanoparticles. A heater can also be provided to simulate various operating temperatures. Temperatures relevant to certain engineering applications can range from about room temperature to about 250° C.

In accordance with the disclosed subject matter, measurements can be taken while the spherical probe is in contact with the first surface. These measurements can include, for purposes of explanation and not limitation, measurements of topography, adhesion, elastic modulus, and conductivity between the spherical probe and the first surface. In accordance with one embodiment, for example, the coefficient of friction can be measured. The measurements can be taken using an atomic force microscope cantilever which carries the spherical probe. The atomic force microscope can include a laser and a photodetector. Known techniques for taking tribological measurements can be used.

In accordance with the disclosed subject matter, the point of contact between the spherical probe and the first surface can be imaged. Imaging can be performed using conventional AFM topographic imaging methods which allow direct observation of the sliding zone during friction measurements, or immediately before and after. Thus, the disclosed subject matter can provide a method for real time, in situ imaging of the contact region while the tribometer is in use. The lateral resolution can depend upon the diameter of the probe (which can vary, for example, between about 1 m and about 100 μm) and the surface roughness of the probe. In accordance with embodiments of the disclosed subject matter, the lateral resolution can be, for example, on the range of a few tens of nanometers.

In accordance with embodiments of the disclosed subject matter, the spherical probe can be removed and a sharp AFM probe can be used to perform high resolution imaging and characterization of the sliding zone.

In one aspect of the disclosed subject matter, an in situ tribological technique is provided. The in situ technique can allow investigation of a large variety of materials surfaces in multi-asperity geometry. A method or in situ measurement of tribological properties can include simultaneous measurement of the coefficient of friction during sliding in multi-asperity geometry and topographic imagining of the sliding interface with nanometer resolution. The technique can be used for a variety of materials, including technologically important materials such as steel, silicon, and diamond-like carbon (DLC). The techniques can be used, for example, for design of automotive engine components which are typically made of steel or DLC-coated surfaces. The sliding zone can be accessible for further in situ characterization of the morphology or mechanical properties with high spatial resolution, e.g., by using known nanometer sharp AFM probes. Other material imaging and characterization methods can also be used for ex situ characterization of the sliding zone.

EXAMPLE

An example of the disclosed subject matter is provided herein for purpose of illustration, and not limitation.

Steel substrates (52100 steel), heat treated to achieve 60 Rockwell C scale hardness (Heckel Tools & Mfg. Corp., Eagle, Wis., USA) were mirror polished using silicon carbide polishing paper discs (180, 240, and 320 Grit), followed by polishing on a Rayon polishing cloth using micro diamond suspension (South Bay Technologies, San Clemente, Calif.). Commercial silicon cantilevers (PPP-NCH, Nanosensors, Neuchatel, Switzerland) used in these measurements were first calibrated for their normal and lateral spring constants using the Sader method. The steel probes were prepared by gluing steel microspheres (SHS 7574 HVOF, The NanoSteel Co., Rhode Island, USA) on calibrated cantilevers using an inverted optical microscope (Alessi REL-4100A, Redwood City, Calif., USA) by first applying a small quantity of a two-part epoxy (J-B Weld, Sulphur Springs, Tex., USA) using a sharp tungsten wire (TGW0325, World Precision Instruments, Sarasota, Fla., USA) and then placing the bead using a strand of hair. The cantilevers were stored overnight in a dry, $N_2$ purged box to allow the epoxy to fully cure. The diameters of the microspheres attached to the cantilevers were estimated either from optical imaging (Olympus BX51) or using field emission scanning electron microscopy (SEM, JOEL 7500F) as shown in FIG. 1B.

Figure 6:
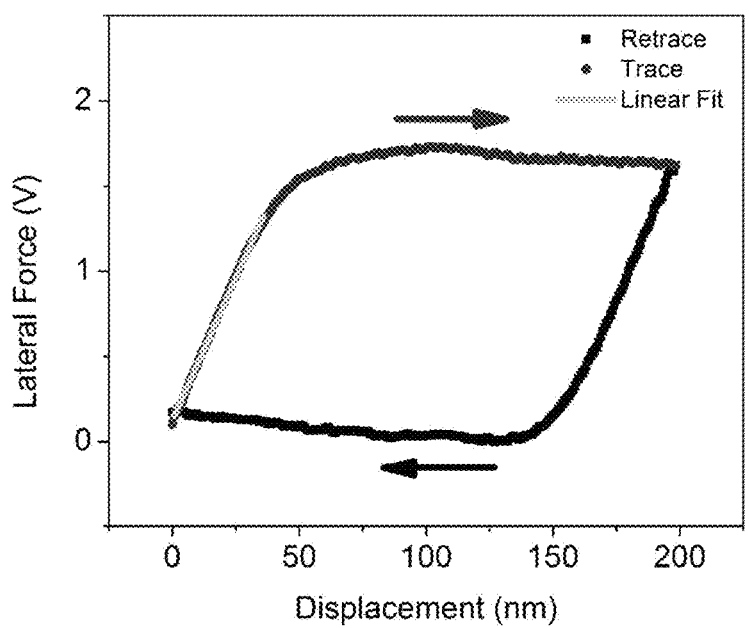
FIG. 6 shows a lateral force vs. displacement curve obtained using a tribometer in accordance with an exemplary embodiment of the disclosed subject matter.

The normal and lateral spring constants were corrected after gluing the bead, which results in a variation in the effective length of the cantilever (distance between the base of the cantilever to the center of the glued bead) as well as the tip height. Testing was performed using a commercial atomic force microscope (Keysight 5500, Keysight Technologies, Santa Clara Calif., USA), equipped with a sample heating plate, liquid cell and a temperature controller (Model 321, Lake Shore Cryotronics Inc., Westerville, Ohio, USA) as shown in the schematic (FIG. 2). The cantilever deflection sensitivities along the normal direction were obtained by taking force curves on the steel substrate surface, whereas lateral force sensitivities were obtained from the static friction vs. distance curve (FIG. 6). A mixture of 99 wt % base oil (SpectraSyn polyalphaolefin (PAO) 4 cSt, Exxon-Mobil, Houston, Tex., USA) with 1 wt % zincdialkyldithiophosphate (ZDDP) antiwear additives (HiTEC 1656-mixed primary/secondary ZDDP, Afton Chemical Corp., Richmond, Va., USA) was used.

Steel probes mounted on AFM cantilevers were used to measure the coefficient of friction for lubricated steel-on-steel contacts. The calibration of the lateral force sensitivity of the steel probe cantilever can be calibrated based on friction loops, obtained by measuring the lateral deflection signal of the cantilever during the forward and reverse sliding directions. FIG. 6 shows a lateral force vs. displacement curve obtained using a steel probe sliding on a polished steel substrate, immersed in a lubricant bath containing ZDDP. The lateral force vs. displacement curve shows two distinct regimes: linear increase of lateral force with lateral displacement in the stick-regime (static friction regime, i.e., the relative displacement between the probe and the surface is zero while the base of the cantilever is being displaced by the piezo-scanner), followed by a constant lateral force vs. lateral displacement, i.e., continuous sliding of the probe occurring in the second regime (kinetic friction regime). The lateral force $F_L$ can be calculated by multiplying the lateral deflection signal (in Volts) to the lateral force sensitivity (slope of the stick regime in nm/V) and the cantilever stiffness (in N/m).

Next, the steel probe was used to image the topography of the substrate surface as well as perform simultaneous friction measurements. The morphology of the steel substrate can be substantially equally well-resolved using a sharp AFM probe and using a steel probe, enabled by the nanometer roughness of the steel probe, i.e., the asperity which protrudes more compared to the others can contribute most to the topographic image. The nanoscale roughness of the steel probe can be directly imaged using a sharp AFM probe by optically aligning the AFM cantilever with sharp tip right above the steel probe surface. The ability to easily perform high resolution direct imaging of the steel probe surface can also enable measurement of any wear occurring on the steel probe, within the contact zone.

Figure 7:
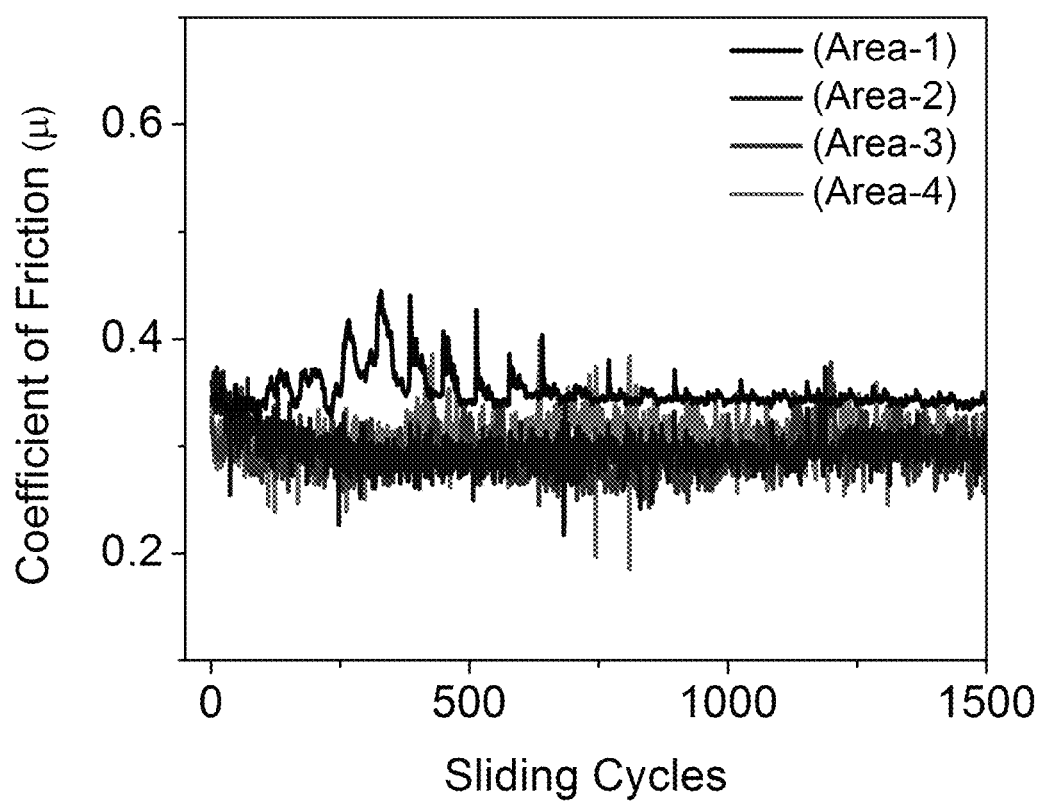
FIG. 7 shows a plot of coefficient of friction ($\mu$) vs. sliding cycles for a steel colloid probe sliding on a mirror polished steel substrate in a lubricated contact (PAO containing 1 wt % ZDDP) in accordance with an example of the disclosed subject matter.

Coefficient of friction measurements were performed under PAO containing 1 wt % ZDDP in four different regions and the morphology of the substrate surface was continuously monitored. The normal load of 12.32 µN was used which corresponds to a mean Hertzian pressure of ~0.2 GPa. Sliding speed of 100 µm/s was used and the tests were performed at room temperature. Coefficient of friction is plotted for measurements performed at room temperature as well as at elevated temperatures (FIG. 7). As illustrated by FIG. 7, the room temperature data shows higher friction as well as comparatively large fluctuations in the beginning. The surface was also directly imaged after sliding the probe at room temperature for 200 cycles. The acquired image demonstrated changes in the surface morphology within the sliding zone. No growth of any sliding induced material transfer or tribochemical film was observed. However, nucleation and growth of the antiwear tribofilms were observed within the sliding zone upon continuous sliding at elevated temperatures (~100 C).

The presently disclosed subject matter is not to be limited in scope by the specific embodiments herein. Indeed, various modifications of the disclosed subject matter in addition to those described herein will become apparent to those skilled in the art from the foregoing description and the accompanying figures. Such modifications are intended to fall within the scope of the appended claims.

The invention claimed is:

1. A tribometer for determining one or more characteristics of a surface of a sample, comprising:
   an atomic force microscope comprising a cantilever configured to detect lateral and vertical deformations of the cantilever;
   a probe attached to an end of the cantilever of the atomic force microscope, wherein the probe comprises a spherical structure;
   a cell for holding the sample with the surface comprising a sliding zone to be characterized;
   a control unit communicatively coupled with the atomic force microscope and configured to slide the probe over the sliding zone of the sample and determine the one or more characteristics based on a lateral deflection signal of the cantilever generated from the detected deformations of the cantilever, wherein the control unit is configured to simultaneously cause the probe to form an antiwear tribofilm within the sliding zone, image a topography of the sliding zone of the sample, and determine the one or more characteristics without removing the sample from the cell; and
   a heating element adapted to maintain the cell at a predetermined temperature.

2. The tribometer of claim 1, wherein the one or more characteristics include one or more of a friction force or a coefficient of friction, a characteristic corresponding to wear, a characteristic corresponding to adhesion, or a characteristic corresponding to elastic modulus.

3. The tribometer of claim 1, wherein the cell comprises a liquid cell and the sliding zone of the sample is immersed in a lubricant.

4. The tribometer of claim 1, wherein the probe is a spherical probe.

5. The tribometer of claim 4, wherein the probe has a diameter of between 1 µm and 100 µm.

6. The tribometer of claim 1, wherein the probe is formed from steel.

7. A method for determining one or more characteristics of a surface of a sample using an atomic force microscope including a cantilever having a probe attached thereto, comprising:
   positioning the sample within a cell;
   sliding the probe over a sliding zone of the surface of the sample within the cell, wherein the probe comprises a spherical structure;
   detecting lateral and vertical deformations of the cantilever using the atomic force microscope as the probe is slid over the sliding zone;
   determining one or more characteristics of the sliding zone based on the detected lateral deformations of the cantilever;
   maintaining the cell at a predetermined temperature using a heating element; and
   simultaneously forming an antiwear tribofilm within the sliding zone, imaging a topography of the sliding zone of the sample, and determining the one or more characteristics without removing the sample from the cell.

8. The method of claim 7, wherein the one or more characteristics of the sliding zone includes one or more of a coefficient of friction, a characteristic corresponding to wear, a characteristic corresponding to adhesion, or a characteristic corresponding to elastic modulus.

9. The method of claim 7, wherein the cell comprises a liquid cell, further comprising:
   immersing the sliding zone of the sample in a lubricant.

10. The method of claim 7, wherein the probe is a spherical probe.

11. The method of claim 10, wherein the probe has a diameter of between 1 µm and 100 µm.

12. The method of claim 7, wherein the probe is formed from steel.

* * * * *